United States Patent [19]

Kerstein et al.

[11] Patent Number: 5,050,821

[45] Date of Patent: Sep. 24, 1991

[54] MODULAR PAYLOAD TRANSPORT AND OPERATING DEVICE FOR SPACE VEHICLE

[75] Inventors: Lothar Kerstein, Sottrum; Manfred Riess, Ganderkesee; Juergen Weydandt, Bremen, all of Fed. Rep. of Germany

[73] Assignee: Erno GmbH, Bremen, Fed. Rep. of Germany

[21] Appl. No.: 28,238

[22] Filed: Mar. 20, 1987

[30] Foreign Application Priority Data

Mar. 22, 1986 [DE] Fed. Rep. of Germany ....... 3609770

[51] Int. Cl.$^5$ ............................................. B64G 1/00
[52] U.S. Cl. ................................ 244/158 R; 244/159; 52/79.5
[58] Field of Search ............... 244/158, 159, 162, 161; 52/79.5

[56] References Cited

U.S. PATENT DOCUMENTS

| | | | |
|---|---|---|---|
| 3,380,687 | 4/1968 | Wrench et al. | 244/158 R |
| 3,832,811 | 9/1974 | Briel, Jr. | 52/79.5 |
| 4,079,904 | 3/1978 | Groskopfs et al. | 244/162 |
| 4,132,373 | 1/1979 | Lang | 244/159 |
| 4,298,178 | 11/1981 | Hujsak | 244/158 R |

FOREIGN PATENT DOCUMENTS 2173467 10/1986 United Kingdom ............ 244/158 R

OTHER PUBLICATIONS

"Use of Pallet-Type Structures in Shuttle-Attached and Free-Flying Modes", A. McGrath and G. Peters, 8 May 1980.

"The German Material Processing in Space Activities", Gottfried, Greger.

Primary Examiner—Joseph F. Peters, Jr.
Assistant Examiner—Christopher P. Ellis
Attorney, Agent, or Firm—Ralf H. Siegemund

[57] ABSTRACT

A payload transport and operating device for space vehicles is assembled from a plurality of standardized payload fastening plates and a plurality of container parts for assembling therfrom a plurality of different payload transport and operating containers; and selected ones of those plates are fastened to a selected one of the containers upon being assembled in a releasable and exchangeable fashion.

12 Claims, 4 Drawing Sheets

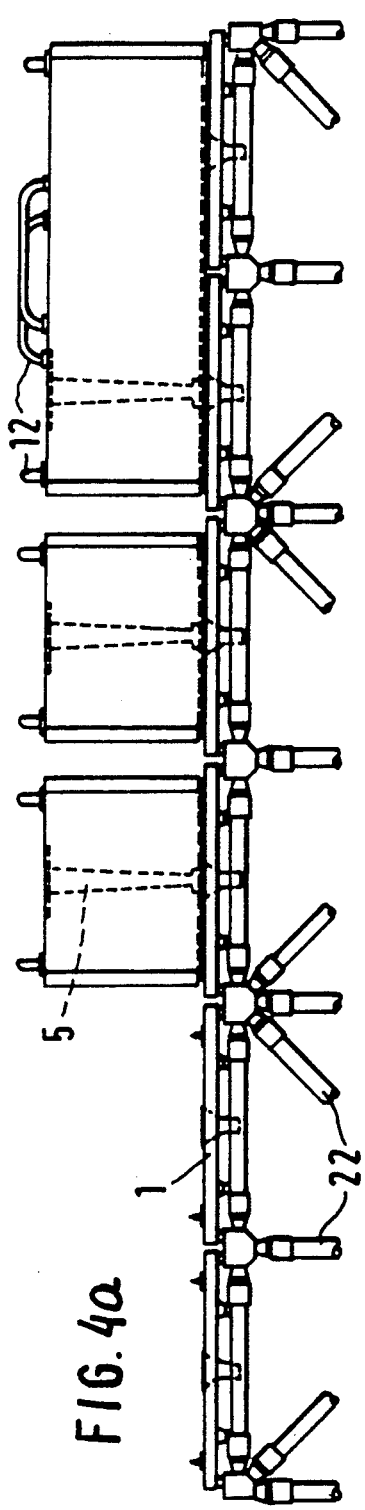
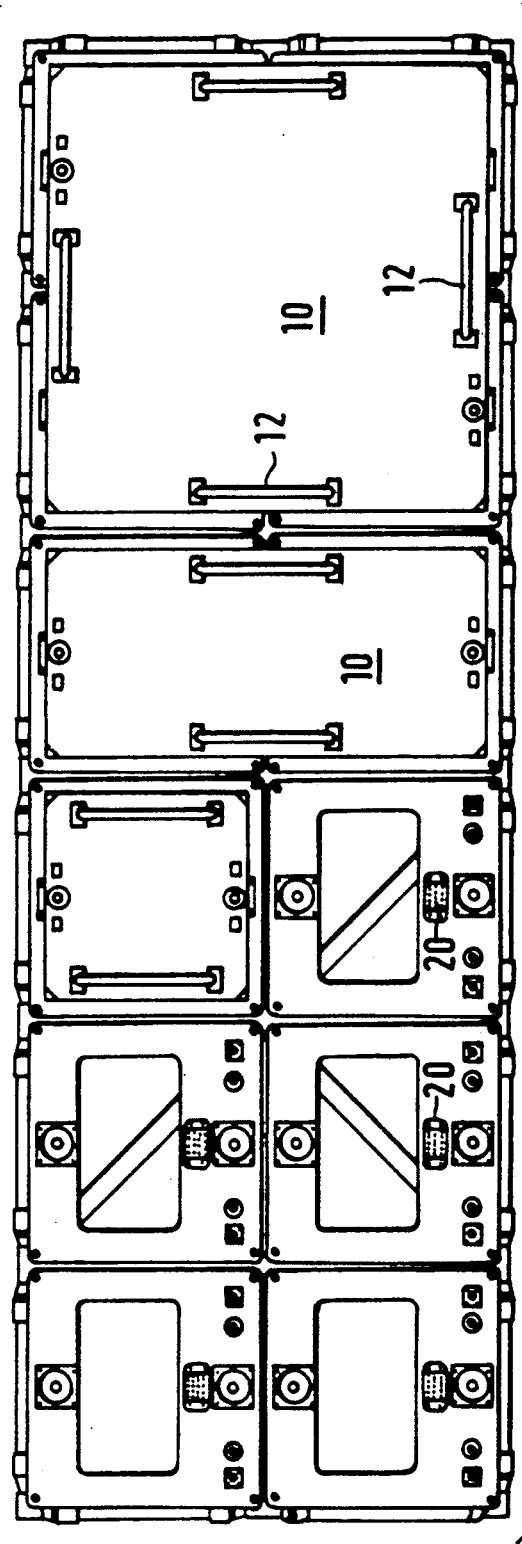
FIG.4a
FIG.4b

MODULAR PAYLOAD TRANSPORT AND OPERATING DEVICE FOR SPACE VEHICLE

BACKGROUND OF THE INVENTION

The present invention relates to payload transport and operation, and to facilities for the purposes of transporting and operating a payload in space vehicles.

Generally, it is known to conduct experiments in space vehicles, and the necessary equipment constitutes a payload for such a vehicle. These payloads are, to some extent, separate from the vehicle itself, but are connected to the vehicle mechanically, as well as electrically, and thermally or thermo-technologically. The connection is, more or less, a rigid one, and there is a unambiguous dependency of the operation of the payload and its equipment from the vehicle itself. In addition, payload containers are known which receive, for example, automatically and autonomously working experimentation equipment. For example, such payload containers are of a cylindrical configuration and they are, for example, fixed components in the cargo space of a space vehicle, for example, the "space shuttle".

There is a disadvantage here that the equipment necessary for the experiment has to be matched very closely to the space offered by and available in the payload container. Moreover, exchanging of the payloads and of the container is possible only on ground. Furthermore, the orbiting and flying time, and, therefore, the time available for experimentation in space, is usually limited to a few days. Unfortunately, acceleration, as well as contamination of the immediate environment resulting, for example, from the activities of the astronauts on board of the vehicle, may interfer with the experiment.

In order to accommodate more realistic requirements for the payloads, including, for example, long operating times and interference free environmental conditions for the experiment vehicles have been developed in which the payloads are, in fact, stored in a standardized fashion, which, moreover, permit exchange of containers and rearranging them in outer space. The invention refers to developments along this line.

DESCRIPTION OF THE INVENTION

It is an object of the present invention to provide a new and improved equipment and device for space vehicles suitable for transporting, as well as operating experimentation equipment using standardized dimensions, as well as standardized, electrical, mechanical, and thermo-technologically interfaces with regard, and in relation to the space vehicle itself. Moreover, these devices should be amenable to fastening as well as removal on earth, as well as in space in a simple fashion.

In accordance with the preferred embodiment of the present invention, the objects are attained, and a particular payload transport and operation device is provided, wherein, as a basic element, a fastening plate is provided to which modular payload containers are connected. Specifically it is suggested to provide a plurality of standardized payload fastening plates which are equipped with fastening elements, centering structures, and suitable plugs for the transfer of electrical and thermo fluid power and energy, and to provide, on the other hand, a plurality of modular elements which can be assembled into standardized payload transport and operating containers, whereby for a particular task, mission, and purpose, one of the payload fastening plates can be selected for connection to one of the assembled payload transport and operating containers, the latter being also provided with suitable counter plugs, and counter centering means to complete the assembly, including passage way for the transfer of electrical power and data as well as fluids.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

FIGS. 4a and 4b are, respectively, side and top elevations, showing a plurality of payload transport and operating containers of various sizes, all fastened to plates of the type shown in FIG. 1, which, in turn, are connected to a space vehicle frame structure.

Figure 1:
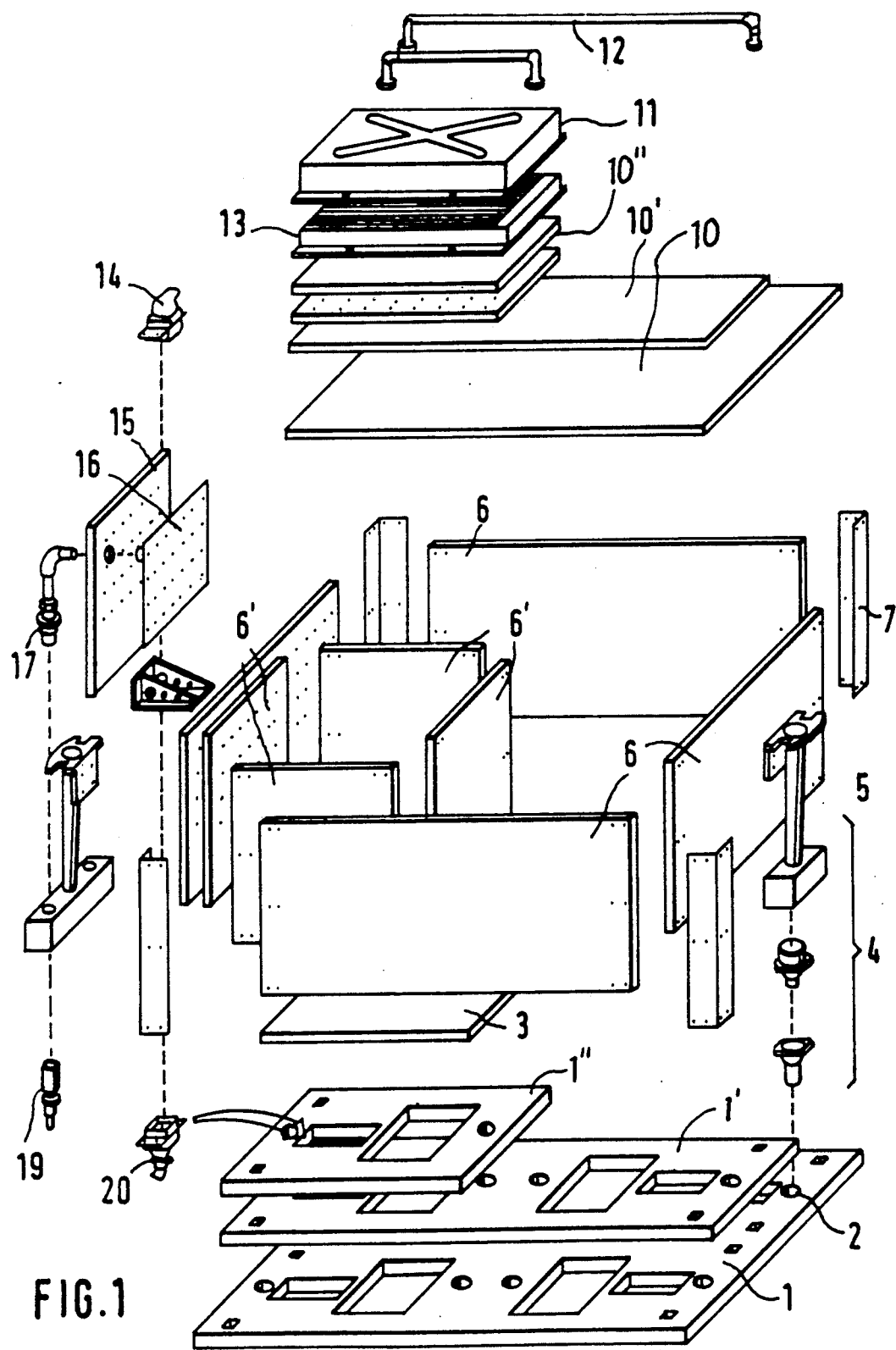
FIG. 1 is an equivalent to an exploded view of a payload transporting and operating system, constructed and to be assembled in accordance with the preferred embodiment of the present invention for practicing the best mode thereof.

Proceeding now to the detailed description of the drawings, FIG. 1, in particular, is an exploded view of not just a single assembly unit, but includes within that illustration the building block and modular aspect of the overall device and inventory that constitutes the principle aspect of the invention. The Figure shows near the bottom, three payload fastening plates 1, 1', and 1", wherein the largest plate 1 has a standardized dimension of $140 \times 140$ cm/$^2$, and is, therefore, square-shaped. The next smaller payload fastening plate 1' is of rectangular configuration with dimensions of $70 \times 140$ cm/$^2$, and the third plate 1" is, again, square-shaped with dimensions of $70 \times 70$ cm/$^2$. Only one of these plates will be used per assembled unit, but owing to the standardized fashion, it can be seen that within a larger assembly (see, for example, FIG. 4) the various payload fastening plates will fit into a pattern in that the space occupied by a single plate 1, can also be occupied by two plates 1' or four plates 1", or by one plate 1' plus two plates 1". These plates can be combined differently for connection to a space vehicle structure 22. They will be fastened thereto such that a completely planar surface is established for purposes of fixing thereto a payload transporting and operating container of the type shown in FIG. 4. Thus, in various combinations, they can be fastened to the space vehicle structure 22, to obtain a fully planar configuration of larger dimension, which, in turn, will accommodate the payload transport and operating container.

Analogously, these containers are composed of bottom plates, only one plate 3 is shown, having dimensions of 60×60 cm/², and are provided for cooperation with a payload fastening plate of the variety 1″, but permitting also utilization of two bottoms in conjunction with a single fastening plate, if that is desired. Other bottom plates will have dimensions of 120×60 cm/² or 120×120 cm/², which are not shown. The containers, moreover, will be assembled from side wall structures, and it can readily be seen that under these circumstances only two types of side walls are needed, namely side wall 6, having a given height (preferably 50 cm) and a maximum length dimension, namely 120 cm, and there are smaller side wall plates 6′, having the same height dimension, but only half the widths, namely 60 cm. Still analogously then, there are available for this building block and modular assembly, three types of cover or cover plates 10, 10′ and 10″ matching the bottom plates such as 3 and others. The standardized individual container parts are thus comprised of sidewalls, such as 6 and 6′, experiment mounting and bottom plates 3, side wall fastening devices and corner pieces 7 and cover devices 10, 10′, 10″. In order to save weight, the side walls 6(6′) and the cover 10, are made of light-weight structure, under utilization of fiber reinforced compound materials, or a honeycomb kind of construction.

Figure 2:
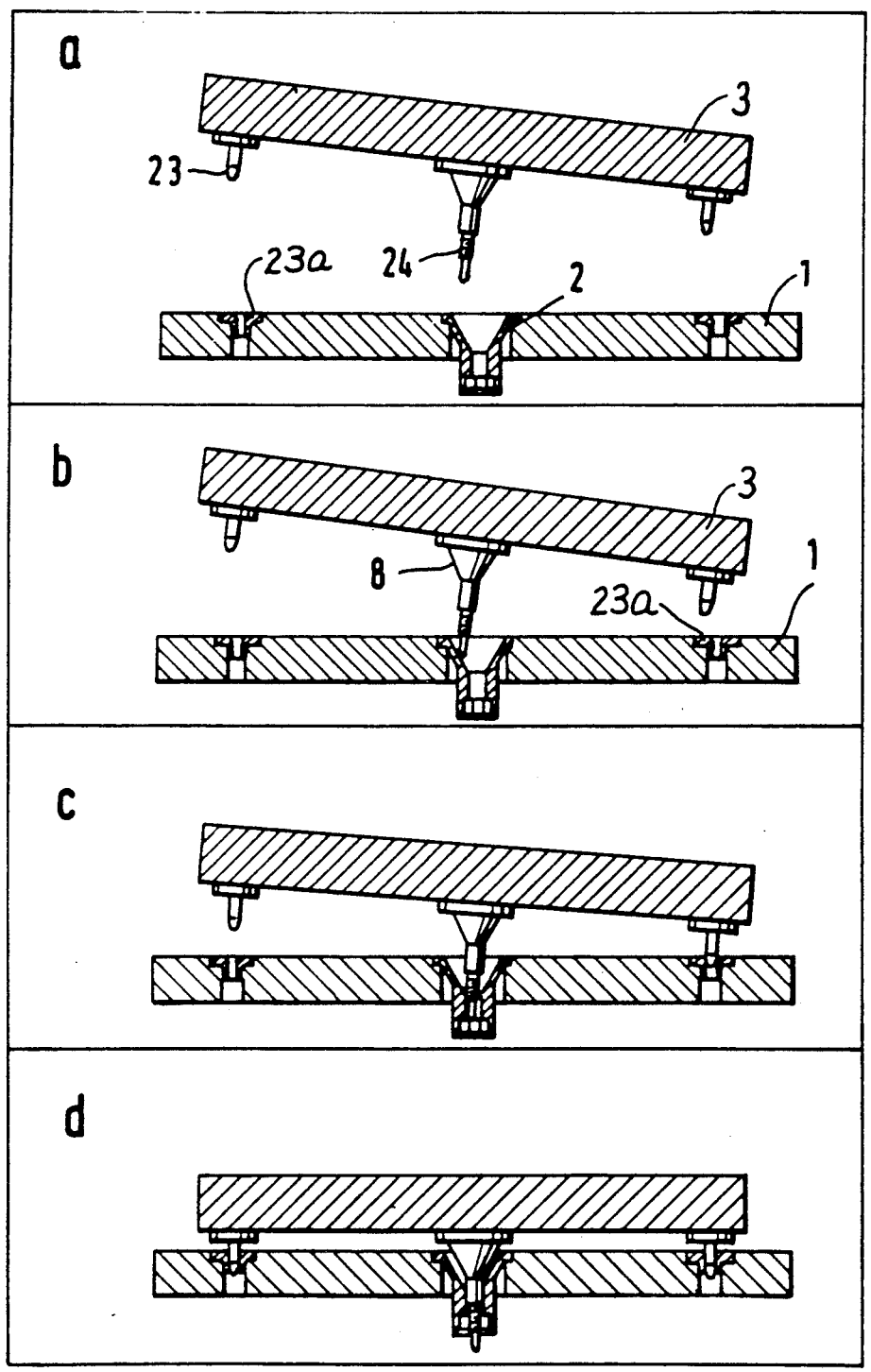
FIG. 2 illustrates in four portions, identified by a, b, c, and d, cross-sections through a payload container and a fastening plate of the type shown in FIG. 1, the four Figures together illustrate the docking procedure, by means of which the payload container is connected to a particular fastening plate.
Figure 3:
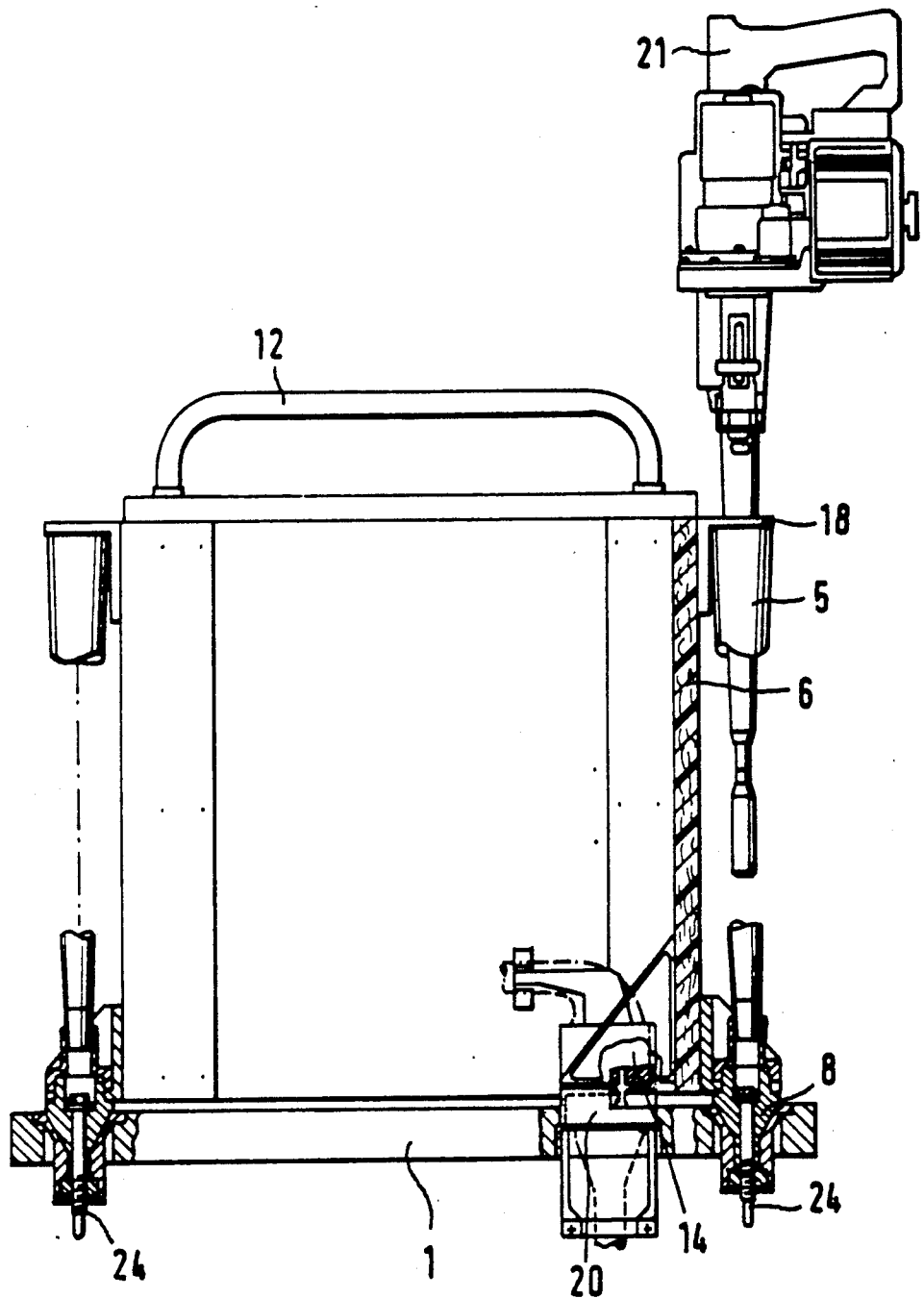
FIG. 3 is a cross-section, illustrating the process of fastening a payload transport and operating container to a fastening plate of the type shown in FIG. 1, under utilization of a screwing machine.

The payload fastening plates 1(1′, 1″), in a general sense, are provided with equipment by means of which mechanical, electrical, and thermo-technological connections can be provided to the respective payload transporting and operating containers. For purposes of establishing electrical connection, a standardized multi-prong plug 20 is provided for each of the plates (1′, 1″). This plug element 20 is connected with conductors for electrical current and power supply, as well as for the transmission of control and information signals leading to the space vehicle. The thermo-technological connection is carried out by means of a standardized plug 19, through which an active flow can be maintained e.g. of a cooling fluid. The mechanical connection is provided through fastening screws 24, as well as four fastening and indexing pins 23 per plate. These pins are situated on the underside of the payload transport and operating container. These pins will be inserted in appropriated fastening bores 23a of and in the plate 1, as shown in FIGS. 2 and 3. As far as container accessories are concerned, they include passive temperature control devices 13, handling and protection covers 11 for the passive temperature control device, liquid partitioning and connecting wall 15 for cooling fluid, a cooling device for fluid 16 generally. Plugs 14 are provided for making electrical contact with the plugs 20 of the payload fastening plates 1; a tube plug 17 provides connection between the active liquid cooling device 16 of the container and the plug or connector plug 19 on the payload fastening plate 1. Additional fastening devices 4 are provided for the payload transport and operating container itself.

Preferably, a particular single payload transport and operating container is comprised of a single, experimental bottom plate such as 3, or large four side walls 6(or 6′), four fastening devices 4, one plug 17 for the active liquid cooling device, one plug 14 for the electrical connection, as well as an active liquid cooling device 16, with liquid cooling device connecting wall 15.

Alternatively, such a container may include just an experiment carrying bottom plate 3, two side walls 6 with payload container fastening devices 4, the plug 14 for the electrical connections, and two handles 12; the latter also come in two sizes.

The fastening of the payload transport and operating container to the payload fastening plate 1 is, for example, carried out in orbiting by an astronaut, or by means of an automated or remote-controlled manipulator with appropriate manipulator arms. For facilitating this fastening procedure, the general fastening structure 2 on the plate 1, and the fastening elements 8 on the container are provided in matching conical configuration. Should, for some reason, the container be obliquely placed in relation to the payload fastening plate 1, then these parts assume indexing functions, so that particularly the fastening and indexing pins 23 permit an accurate positioning of the container on the plate, as shown in the sequence of FIG. 2a–2d.

The fastening screws 24 on the two fastening elements 8 will subsequently be screwed by means of a screwing machine 21 into the threaded portion of fastening structure 2. This screwing tool 21 can be placed on a suitable angle bracket 18 which provides for the requisite alignment. The tool is held by and run through the funnel-shaped tooling guide device 5 mounted on the bracket 18. The screws 24 have previously been appropriately placed into the respective container between plates so that the machine 21 can tighten them. During tightening of the screws 24, the pins 23 center the container such that the plugs/counter plugs 14 and 20, on one hand, and plugs/counterplugs 17 and 19, on the other hand, are interconnected.

Should the need arise to separate the payload transport and operating container from the payload fastening plate 1, then upon release of the screws 24, the plugs 14, 20, and 17, 19, are likewise released. An astronaut simply has to exert very little force to separate these parts in order to remove the payload transport and operating container from the plate 1 by means of the handles 12.

The payload transport and operating device, generally, as described, permits a variable assembly of various kinds of payloads for or in a space vehicle. The volume and the shape of the payloads does not depend on a particular container size but merely on the requirements that are made for a particular experiment. The payload transport and operating container will be connected to a common electrical and thermo-technological supply device, including any requisite discharge channels. These connections, as outlined above, can be made with similar ease on earth, as well as in outer space.

The invention is not limited to the embodiments described above, but all changes and modifications thereof, not constituting departures from the spirit and scope of the invention are intended to be included.

We claim:

1. Payload transport and operating device for space vehicles, comprising:
    a planar payload fastening plate; and
    a plurality of payload transport and operating containers releasably and exchangeably fastened to said plate and assembled from a plurality of plates, walls and bottoms selected respectively from a plurality of different size plates, walls and bottoms.

2. A payload transport and operating device for space vehicles, comprising:
    a plurality of standardized payload fastening plates of different size;
    a plurality of container parts including bottoms; side walls of different dimensions and tops or covers of different dimensions for assembling therefrom containers by interconnecting respective selected walls, a bottom and a top, as selected from said parts, to obtain a plurality of different payload transport and operating containers; and a selected one of said plates being fastened to a selected one of said containers upon being assembled, in a releasable and exchangeable fashion.

3. Device in accordance with claim 1, wherein said plate is mounted to a satellite structure.

4. Device in accordance with claim 2, wherein said plates are mounted to a satellite structure.

5. Device as in claim 1, including first plug means on the plate, and first counter plug means on the container to be plugged-in the first plug means for providing electric power and data signal communication; further comprising:

second plug means on the plate, and second counter plug means on the container for interconnecting a fluid flow conduction.

6. Device in accordance with claim 1, said containers each having a bottom provided with a plurality of indexing pins, and centrally located fastening screws, said plate having bores for receiving the indexing pins, the bores being provided with counter fastening means as well as with conical surfaces for facilitating insertion of the pins.

7. Payload transport and operating device for space vehicles as in claim 5, said container further having a bottom provided with a plurality of indexing pins, and centrally located fastening screws, said plate having bores for receiving the indexing pins, as well as counter fastening means with conical insertion; and said plug and counter plug means engage upon fastening the bottom to the plate.

8. Payload transport and operating device for space vehicles as in claim 2, there being conical matching fastening means on the selected plate and bottom of the selected container.

9. Payload transport and operating device for space vehicles as in claim 2, wherein plug means and counter plug means are provided for the transport of liquid and electrical signals between the selected plate and the selected container, the plug means being similar regardless of plate and container sizes.

10. Payload transport and operating device for space vehicles as in claim 2, wherein the tops include liquid cooling means.

11. Payload transport and operating device for space vehicles as in claim 2, including a plurality of handle means for selective attachment to a selected one of the tops.

12. Payload transport and operating device for space vehicles as in claim 1, including holder means on one of the side walls for positioning and indexing a screwing machine.

* * * * *